(12) United States Patent
Alexandru

(10) Patent No.: US 6,704,438 B1
(45) Date of Patent: Mar. 9, 2004

(54) APPARATUS AND METHOD FOR IMPROVING THE SIGNAL TO NOISE RATIO ON ULTRASOUND IMAGES USING CODED WAVEFORMS

(75) Inventor: Radu Alexandru, Cheshire, CT (US)

(73) Assignee: Aloka Co., Ltd. (JP)

( * ) Notice: Subject to any disclaimer, the term of this patent is extended or adjusted under 35 U.S.C. 154(b) by 0 days.

(21) Appl. No.: 09/566,550

(22) Filed: May 8, 2000

(51) Int. Cl.[7] .................................................. G06K 9/00
(52) U.S. Cl. ...................... 382/128; 128/915; 708/404; 342/196; 324/76.19
(58) Field of Search ................................. 382/128, 260, 382/261, 275, 280; 128/915, 916; 702/39, 69, 77, 159, 171; 600/407, 437; 348/163; 708/404; 342/192; 324/76.12, 76.19, 76.22, 613, 614

(56) References Cited

U.S. PATENT DOCUMENTS

| | | | |
|---|---|---|---|
| 4,063,549 A | * 12/1977 | Beretsky et al. ............ 600/443 |
| 4,593,161 A | * 6/1986 | Desblache et al. .......... 379/377 |
| 4,950,999 A | * 8/1990 | Agnello et al. ........... 324/76.22 |
| 5,379,642 A | * 1/1995 | Reckwerdt et al. ........... 73/625 |
| 5,455,590 A | * 10/1995 | Collins et al. .............. 342/179 |
| 5,502,747 A | * 3/1996 | McGrath .................... 375/350 |
| 5,790,475 A | * 8/1998 | Marmarelis et al. ........ 367/100 |
| 5,831,934 A | * 11/1998 | Gill et al. ..................... 367/25 |
| 5,886,749 A | * 3/1999 | Williams et al. ............ 348/614 |
| 5,930,305 A | * 7/1999 | Leib ............................ 375/324 |
| 6,104,670 A | * 8/2000 | Hossack et al. ................ 367/7 |
| 6,104,822 A | * 8/2000 | Melanson et al. ........... 381/320 |
| 6,185,594 B1 | * 2/2001 | Hilton et al. ................ 708/270 |
| 6,343,510 B1 | * 2/2002 | Neeson et al. ................ 73/602 |
| 6,466,277 B1 | * 10/2002 | McNeely ..................... 348/724 |

OTHER PUBLICATIONS

"Radar Principles", Peyton Z. Peebles, Jr., Chapter 7, "Pulse Compression With Radar Signals".
"Coded Excitation System for Improving the Penetration of Real–Time Phased–Array Imaging Systems", Matthew O'Donnell, Senior Member, IEEE. "IEEE Transactions On Ultrasonics, Ferroelectrics, And Frequency Control", vol. 39, No., 3, May 1992.

* cited by examiner

Primary Examiner—Andrew W. Johns
Assistant Examiner—Shervin Nakhjavan
(74) Attorney, Agent, or Firm—Bachman & LaPointe, P.C.

(57) ABSTRACT

A parallel, frequency domain filter (50) for providing frequency-dependent phase delay for real data includes a fast Fourier transform (FFT) device (52), a complex multiplier (54), a filter memory (56) and an inverse fast Fourier transform (IFFT) device (58). The FFT and IFFT devices (52) and (58) are shown with two inputs and two outputs each. The filter (50) of the present invention allows for increased throughput by filtering two real signals in parallel, one being applied to the real input of FFT device (52) and the other being applied to the imaginary input of FFT device (52). The filter memory 56 of FIG. 2 is provided with sufficient capacity to store several filter frequency characteristics. The appropriate filter frequency characteristic for the particular digitized rf signal being processed can be selected based on factors such as beam focus depth. The parallel, frequency domain filter (50) allows the use of coded waveforms to improve signal to noise ratio in ultrasound images.

23 Claims, 4 Drawing Sheets

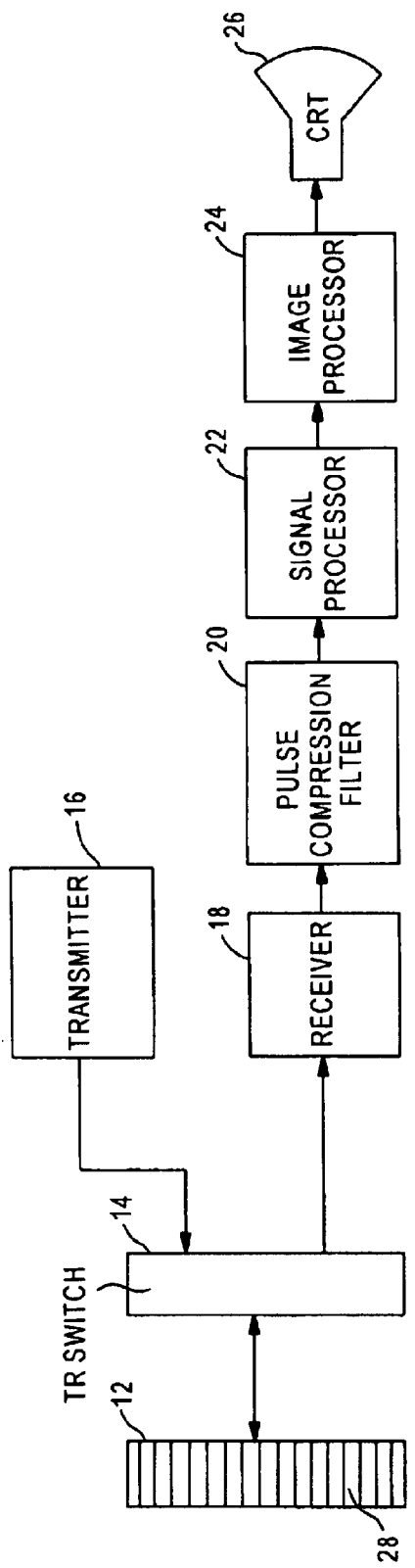
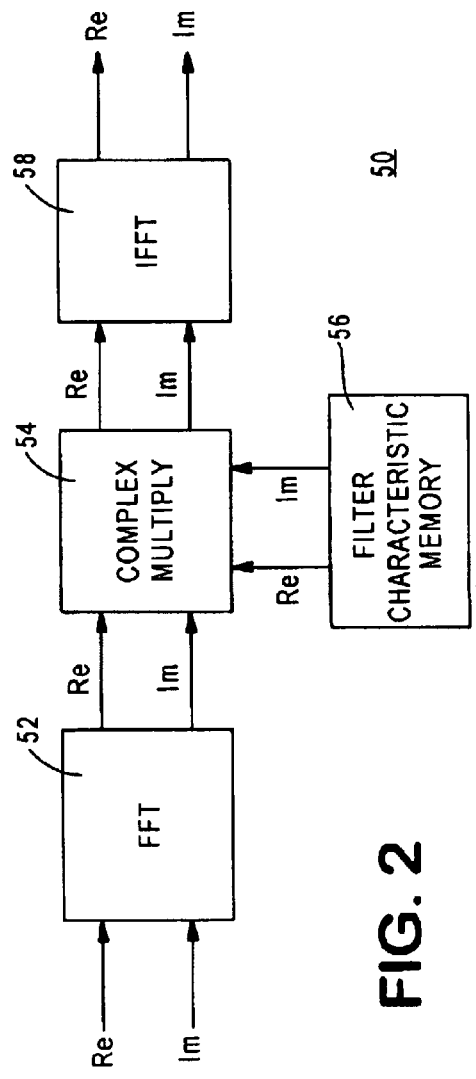
FIG. 1
FIG. 2

APPARATUS AND METHOD FOR IMPROVING THE SIGNAL TO NOISE RATIO ON ULTRASOUND IMAGES USING CODED WAVEFORMS

FIELD OF INVENTION

This invention relates primarily to the field of coherent imaging and, more specifically, to an apparatus and method for improving the signal to noise ratio in a coherent imaging system using coded waveforms.

BACKGROUND OF INVENTION

In ultrasound imaging a transducer is used first to transmit ultrasound waves in the medium to be examined, for example a region of the human body, nd then to receive the ultrasound echoes from various discontinuities in the medium and to transform them into electrical signals. The received electrical signals are then processed in various ways, e.g. amplified, filtered, beamformed, detected, and eventually transformed into a set of digital values (pixels) that can be displayed on an electronic display such as a cathode ray tube (CRT), or can be used to produce a photograph. One of the major limitations of ultrasound imaging and of other coherent imaging systems is electrical noise. When the signal to noise ratio (SNR) is low, the useful information may be totally or partially covered by noise. Manufacturers make a great effort to design low noise systems, however, a certain level of thermal noise is present in any electronic system. Therefore, once this minimal noise level has been attained, the only way to improve the SNR is to increase the signal, and this is achieved by increasing the amount of transmitted energy.

Increasing the signal's amplitude and/or its duration will increase the signal energy. However, there are limits to how much the amplitude of the signal can be increased. For example, in radar there are practical implementation limits to the maximum amplitude; and in medical ultrasound the limits have to do with the safety of the patient, since high sound amplitude may cause tissue damage. In order to increase the signal energy without increasing its amplitude, a long duration waveform must be transmitted. If this long waveform were a simple sinusoidal burst then the signal bandwidth would decrease compared to the short pulse, causing the axial resolution to decrease proportionally. Therefore, the transmitted signal must be frequency modulated—hence the name 'coded waveform'—such that the long waveform's bandwidth is kept equal to or larger than that of the conventional short pulse. This is roughly equivalent to transmitting a different instantaneous frequency at each transmission period.

When the transmitted signal is a coded waveform, the received echo signal is processed with a 'pulse compression filter'. A pulse compression filter applies a different phase delay to each frequency component such that all frequencies are phase aligned to constructively add the frequencies, and thereby produce a short, high-amplitude 'compressed' pulse. The method of coded waveforms is well known and described in many communication theory and radar textbooks, for example *Radar Principles* by Peyton Z. Peebles, Jr., John Wiley & Sons, Inc., 1998. Specifics of applying the method to medical ultrasound have also been published, for example by M. O'Donnell in the article 'Coded excitation systems for improving the penetration of real-time phased-array imaging systems', IEEE Transactions UFFC, Vol. 39, No. 3, May 1992.

A first difficulty in implementing the coded waveform method is the cost of the pulse compression filter. In the high performance applications of concern, the pulse compression filter is implemented as a digital FIR (finite impulse response) filter, whose cost increases with the number of filter taps (i.e., the number of samples in the filter's impulse response). The number of filter taps is the product of the filter duration and the sampling rate, and may be over 512 taps for medical ultrasound and even larger for radar applications. When a long data stream must be filtered in real time, requiring one multiplier for each filter tap, the filter cost becomes prohibitive.

It is well known that for filtering a long data stream it is more efficient to perform the convolution in the frequency domain: a FFT (fast Fourier transform) is first applied to the data, the transforms of the data and of the filter are then multiplied and the result is inversely transformed (IFFT) to produce the filtered signal. Even though this approach reduces the computational load, the task is still very difficult at the data rates encountered in many applications.

A known method to reduce the number of computations is to perform the FFT on two sets of data in parallel by applying one set of data to the real input of an FFT processor and another set of data to the imaginary input of the FFT processor. After transformation the FFT's of the two signals are separated then multiplied by the filter's FFT, and inversely transformed separately. This method reduces the total amount of computations by a little over 20%, not a significant improvement.

Another method to reduce the number of computations needed for pulse compressing the rf coded waveforms is to demodulate the rf signals to baseband and decimate them before pulse compression, thus reducing the sampling rate. However in ultrasound applications, where the useful bandwidth is over 50% of the center frequency, this method produces little if any savings, and may result in poor axial profiles due to additional difficulties in designing the proper pulse compression filter. It is therefore desirable to provide a method to reduce the number of computations needed for pulse compressing the rf coded waveforms.

A second problem of coded waveform systems is caused by the distortion of the signal due to nonlinearities in the transmit and receive circuits and in the medium, and due to frequency dependent attenuation in the medium. The pulse compression filter is designed for a specific waveform shape and its performance deteriorates when applied to distorted waveforms. It is therefore desirable to provide a simple method to compensate for such waveform distortions.

SUMMARY OF THE INVENTION

In a coherent imaging system capable of performing coded waveform imaging, a pulse compression filter is implemented using frequency domain convolution. The pulse compression filter is applied to the real rf data (before quadrature demodulation). The filter's frequency characteristics are designed to correspond to a real impulse response. This allows two real signals to be packed into one complex signal that can be filtered as such without any intermediate operations, thus reducing the number of computations to half. Packing and unpacking circuits are provided at the input and output of the filter.

In one embodiment, the filtering is applied to conveniently sized segments of the signal, corresponding to different depth regions. The frequency domain filter is provided with buffers for multiple filter frequency responses, each of which can be applied to the appropriate depth segment. The various filter frequency responses may be obtained in a calibration process performed off-line before the actual use of the apparatus.

BRIEF DESCRIPTION OF THE DRAWINGS

Referring now to the drawings wherein like elements are numbered alike in the several Figures:

FIG. 1 is a simplified block diagram of an ultrasound imaging system incorporating a parallel filter of the present invention;

FIG. 2 is a block diagram of the parallel, frequency domain filter of the present invention;

DETAILED DESCRIPTION OF THE INVENTION

Figure 3:
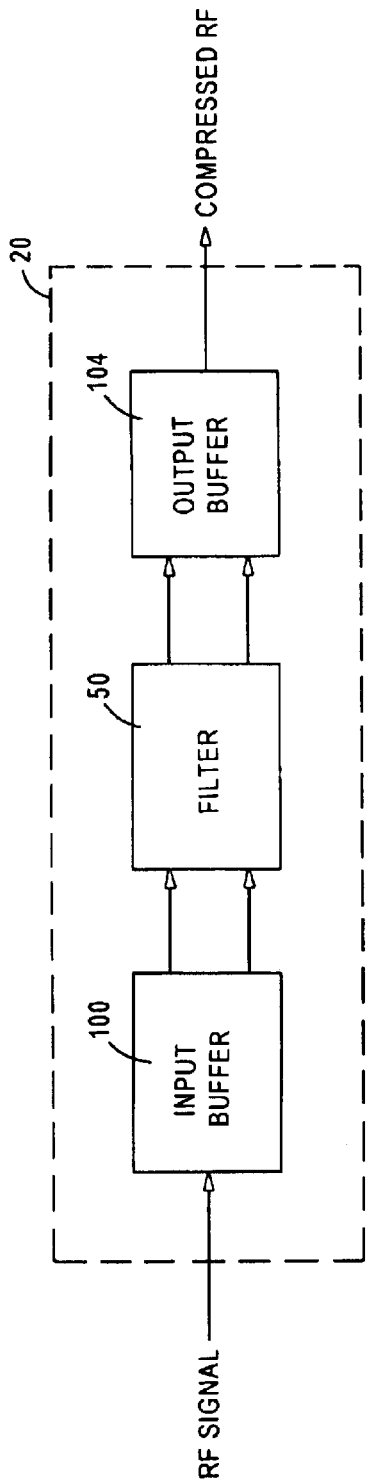
FIG. 3 is a block diagram of a pulse compression filter including the parallel filter of FIG. 2.

FIG. 1 is a simplified block diagram of a medical ultrasound system 10 in which the parallel filter of the present invention is used. The medical ultrasound system 10 includes a transducer 12, a transmit/receive switch 14, a transmitter 16, a receiver 18, a pulse compression filter 20, a signal processor 22, an image processor 24, and a display device 26. The transducer 12 consists of one or multiple piezoelectric elements 28. The transmit/receive switch 14 connects both the transmitter 16 and the receiver 18 to subsets of elements 28 of the transducer 12. A data acquisition cycle starts with a transmit period in which the transmitter 16 excites the transmit subset of elements 12 with signals of various relative delays and amplitudes and in some cases of different shapes (e.g., coded waveforms such as linear chirp or Barker code) according to various transmit beamforming algorithms. After the transmit period the receiver 18 channels starts receiving signals from the receive subset of elements 28. Within the receiver 18, the signals are amplified, filtered, delayed and weighted according to the receive beamforming algorithm employed to form one or several radio frequency (rf) signals representing beams (scan lines). The analog signals are digitized either before or after beamforming; in either case the output of the receiver 18 is a sequence of digital samples indicative of the analog rf signal. This sequence of digital samples is referred to hereinafter as a digitized rf signal. The digitized rf signal may include, for example, 1024 samples of data. Each digitized rf signal then goes through the pulse compression filter 20 where it undergoes a frequency-dependent phase delay (pulse compression), as will be described in further detail hereinafter. The resulting pulse compressed signal is further processed in the signal processor block 22, where the pulse compressed signal may be demodulated, filtered, detected, log-compressed, decimated and/or interpolated. The resulting signal is then processed in the image processor 24, where it undergoes algorithms such as scan conversion, linear and nonlinear two dimensional filtering, and gray scale or color mapping. The resulting image is displayed on the display device 26, typically a cathode ray tube, and may be also stored on digital or analog media or used to generate a hard copy such as a film or print. The various storage and hard copy devices as well as other blocks such as timing and control, user interface, etc., are not shown in FIG. 1.

FIG. 2 is a block diagram of a parallel, frequency domain filter 50 for providing frequency-dependent phase delay for a digitized rf signal. Filter 50 consists of four blocks: the fast Fourier transform (FFT) block 52, the complex multiplier 54, the filter memory 56 and the inverse fast Fourier transform (IFFT) block 58. The FFT and IFFT blocks 52 and 58 are shown with two inputs and two outputs each. As is known in the art, the Fourier transform, by its definition and structure, operates with complex numbers. Thus, one input and one output in each of blocks 52 and 58 are used for signals representing a real part of the complex signal and one input and one output in each of blocks 52 and 58 are used for signals representing an imaginary part of the complex signal. The filter 50 of the present invention allows for increased throughput by filtering two real signals in parallel, one being applied to the real input and the other being applied to the imaginary input.

Due to the linearity of the convolution operation, when a complex signal is filtered with a filter having purely real impulse response, the real and imaginary parts of the signal are filtered separately without any interaction, such that the real part of the output is the filtered real part of the input and the imaginary part of the output is the filtered imaginary part of the input as shown by the equation:

$$(S_{real} + i \times S_{imaginary}) \circledast w = S_{real} \circledast w + i \times S_{imaginary} \circledast w$$

Where the symbol $\circledast$ stands for convolution, S is the signal, and w is the filter impulse response. Consequently, in the parallel, frequency domain filter 50 of the present invention, when both the signal and the filter are real, the filter's effective throughput is doubled by filtering two real signals in parallel, one being applied to the real input and the other to the imaginary input of filter 50.

In operation, a time-domain complex signal is constructed by providing one digitized rf signal to the real input of the FFT block 52 and providing another digitized rf signal to the imaginary input of the FFT block 52. For example, in a medical ultrasound system, each digitized rf signal may represent a beam provided by receiver 18 (FIG. 1). FFT block 52 transforms the time domain complex signal into the spectral (frequency) domain. The frequency spectrum of the complex signal (i.e., the combined rf input signals) is provided as the real and imaginary inputs to complex multiplication block 54. In block 54, the frequency spectrum is multiplied by an appropriate filter frequency characteristic (filter frequency spectrum), which is stored in filter memory 56. The real and imaginary outputs of block 54 form the frequency spectrum of the pulse compressed complex signal (i.e., the combined pulse compressed rf signals), which are provided as the real and imaginary inputs to IFFT block 58. In IFFT block 58, the frequency spectrum of the pulse compressed complex signal is transformed into the pulse compressed complex signal in the time domain. The real and imaginary outputs of IFFT block 58 are the signals of interest, with the signal provided at the real output of IFFT block 58 (the real part of the pulse compressed complex signal) being the result of filtering the rf signal provided to the real input of FFT block 52, and the signal provided at the imaginary output of IFFT block 58 (the imaginary part of the pulse compressed complex signal) being the result of filtering the rf signal provided to the imaginary input of FFT block 52. As will be described in further detail hereinafter, the appropriate filter frequency characteristic for the particular rf signal being processed can be selected based on factors such as beam focus depth, with the restriction that the corresponding time-domain impulse response of the filter be real.

Parallel, frequency domain filter 50 provides a 100% increase in throughput over the signal filters of the prior art, which use only one input and one output of each FFT and IFFT block. For example, in the prior art, the rf signal will be sent only to the real input, and the imaginary input is fed constant zero values. Also, unlike the well known method of performing the Fourier transform on two real signals in parallel and then separating the transforms of the two signals, in the filter 50 the complex signal is processed as such for the complete filtering operation and the two filtered signals are obtained directly from the real and imaginary parts of the filter 50 output.

In the case of pulse compression filter 20 of FIG. 1, which receives digitized rf signals, the filter impulse response is real by design; therefore the filter 50 of FIG. 2 can be applied therein. It must be pointed out that filter 50 may be used identically in other than pulse compression applications, namely in all signal processing applications in which real signals have to be filtered with real impulse response filters.

Parallel, frequency domain filter 50 can be implemented directly as pulse compression filter 20 of FIG. 1 if the system in which it is installed (e.g., ultrasound system 10) is a parallel system. A parallel system is a system in which the receiver 18 provides two parallel, digitized rf signals and the signal processor 22 can accept two pulse compressed, digitized rf signals in parallel. In such a parallel system, the filter 50 of FIG. 2 would process signals at the rf sampling rate (data input/output rate) required by the system. In other words, for every pair of rf signals provided by the receiver 18, filter 50 will provide a pair of filtered signals to the signal processor 22 without any additional delay on top of the delay required by the processing steps (FFT, multiplication and IFFT) described above.

FIG. 3 is a block diagram of the pulse compression filter 20 for use in a series system. That is, pulse compression filter 20 of FIG. 3 can be used in an ultrasound system 10 of FIG. 1 in which the receiver 18 provides one digitized rf signal at a time and the signal processor 22 accepts one pulse compressed, digitized rf signal at a time. Pulse compression filter 20 includes an input buffer 100 which receives the digitized rf signals from the receiver 18 (FIG. 1), buffers them and packs them into complex signals with one digitized rf signal as the real part of the complex signal and another rf signal as the imaginary part of the complex signal. The real and imaginary parts of the complex signals are then provided as input to the frequency domain filter 50. An output buffer 104 buffers and unpacks the complex output from processor 102 and provides the filtered signals to the signal processor 22 (FIG. 1).

Parallel, frequency domain filter 50 is shown in FIG. 2 as having three processing units: the FFT block 52, the complex multiplier 54, and the IFFT block 58. In a preferred embodiment, filter 50 uses only one processing unit to carry out all three functions: the FFT, multiplication with the filter transfer function, and IFFT. For example, a general purpose DSP chip or a special purpose FFT chip may contain the arithmetic units and the memory buffers needed to perform sequentially all three operations. In the following we will refer to general purpose programmable DSP chips as 'DSP chips' and to special purpose FFT chips as 'FFT chips', even though the later category is also to some extent programmable and can perform other than FFT operations, for example complex multiplication.

Figure 4:
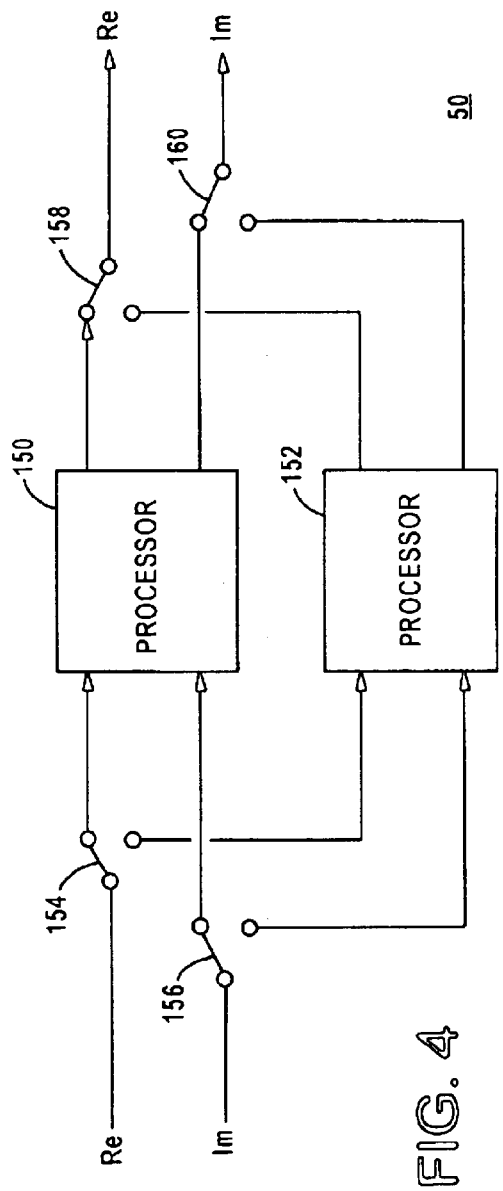
FIG. 4 is a block diagram of the parallel filter of FIG. 2 comprising two processors.

One DSP chip may not be fast enough to perform the functions of filter 50 at the throughput required for typical medical ultrasound or radar systems. Therefore, several DSP or FFT chips (each with its own internal or external buffers) can be used in parallel to achieve the desired throughput. FIG. 4 shows the filter 50 including two DSP or FFT chips 150 and 152. Each chip 150 and 152 includes internal memory buffers for signals and for filter characteristics. In this embodiment, each chip 150 and 152 is able to perform the complete filtering algorithm at half the required data input/output rate and the memory buffers are double-sized and allow new data to be loaded while previously loaded data is being processed.

In operation, as the complex signals are provided by receiver 18 (in a parallel system) or by input buffer 100 (in a series system), switches 154, 156, 158, and 160 (e.g. multiplexers or read/write enable timers) are synchronized to alternately direct the complex signals to chips 150 and 152. For example, every even complex signal can be loaded one in chip 150 and every odd complex signal loaded in chip 152. Each chip 150 and 152 now has twice the available the time to process one complex signal. Thus, the desired throughput is achieved with a pipeline delay of two complex signal times. It will be recognized that the number of parallel chips can be further increased according to the ratio between the chip's processing time and the desired processing time. For example, if each chip's signal input/output rate is one third times the desired throughput, then three chips can be used in parallel (not shown) in a similar arrangement, creating a pipeline delay of three complex signal times.

The number of parallel DSP or FFT chips needed to achieve the desired throughput can be reduced by using the multi-zone imaging method, which is well known in the art. In this method, the total image depth is divided into two or more depth zones and a separate transmit/receive cycle is used to acquire data from each zone. This is typically used in order to optimize the beam generated by transmitter 16 (FIG. 1) for each zone. For example, transmitter 16 will generate a coded waveform in the far zone, where the signal is most attenuated and subject to the poorest signal-to-noise ratio (SNR), and will generate a simple signal consisting of one or multiple cycles of a center frequency for closer zones, where attenuation and SNR are less of a problem. The pulse compression filter 20 is required only when coded waveform imaging is used. Therefore, when coded waveform imaging is used only in the far zone, the time available per-sample for pulse compression filtering is increased by the system time allocated to the closer zones, where coded waveforms and pulse compression filtering are not used.

Figure 5:
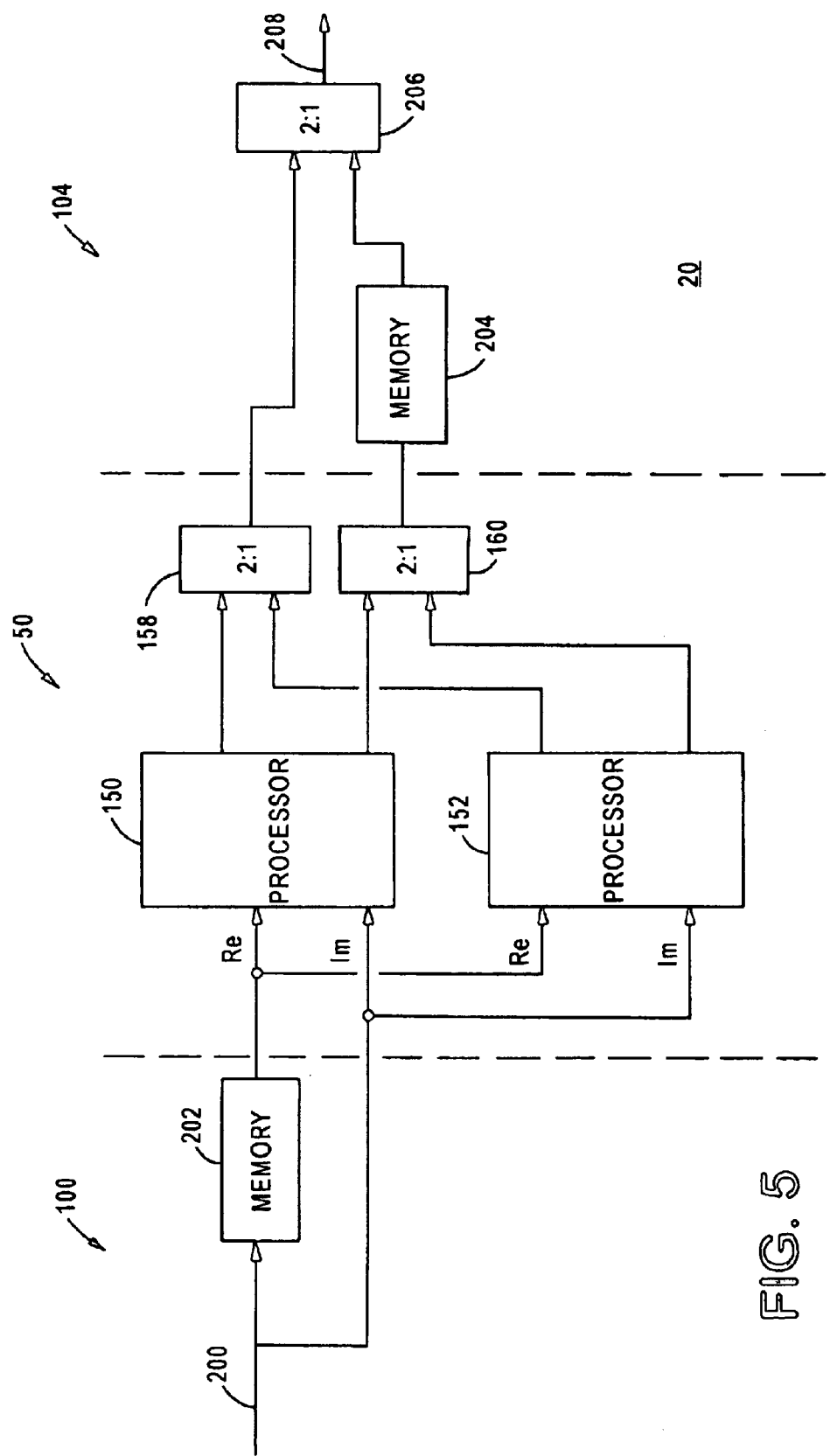
FIG. 5 is a pulse compression filter incorporating the parallel filter of FIG. 4.

Referring to FIG. 5, a pulse compression filter 20 for use in a series system is shown. As described hereinabove, a series system is a system in which the receiver 18 produces one digitized rf signal at a time and the signal processor 6 accepts one pulse compressed, digitized rf signal at a time. Compression unit 20 includes input buffer 100, filter 50, and output buffer 104.

Filter 50 includes DSP or FFT chips 150 and 152. In the embodiment shown in FIG. 5, chips 150 and 152 each can process one complex signal at a rate equal to one quarter of the rate that digitized rf signals are being passed to pulse compression filter 20 by the receiver 18 (FIG. 1). By using the throughput doubling method of the present invention, where the complex signal comprises two digitized rf signals, the effective signal processing rate of each chip 150 and 152 is increased to one half of the desired throughput. As a result, only two chips are needed to achieve the desired throughput. Filter 50 also includes switches 158, and 160, shown here as multiplexers, which may consist of time-shared, tri-state buses.

The input buffer 100 includes a buffer memory 202. Buffer memory 202 is, for example, a first-in-first-out queue (FIFO) or a dual-port random-access memory (RAM) having a storage size equal to that of the signal storage capacity of processing block 150 or 152. For example, if the digitized rf signal includes 1024 data values, then the storage capabilities of the buffer memory 202 and each processor 150 and 152 are some multiple of 1024. Preferably, the number of data values in the digitized rf signal is a power of two or a power of four in order to maximize the efficiency of the FFT algorithm.

The output buffer 104 includes a multiplexer 206 and a buffer memory 204. Buffer memory 204 is, for example, a FIFO or RAM having a storage size equal to that of buffer memory 202. Multiplexers 158, 160, 206 may consist of time-shared, tri-state buses.

Figure 6:
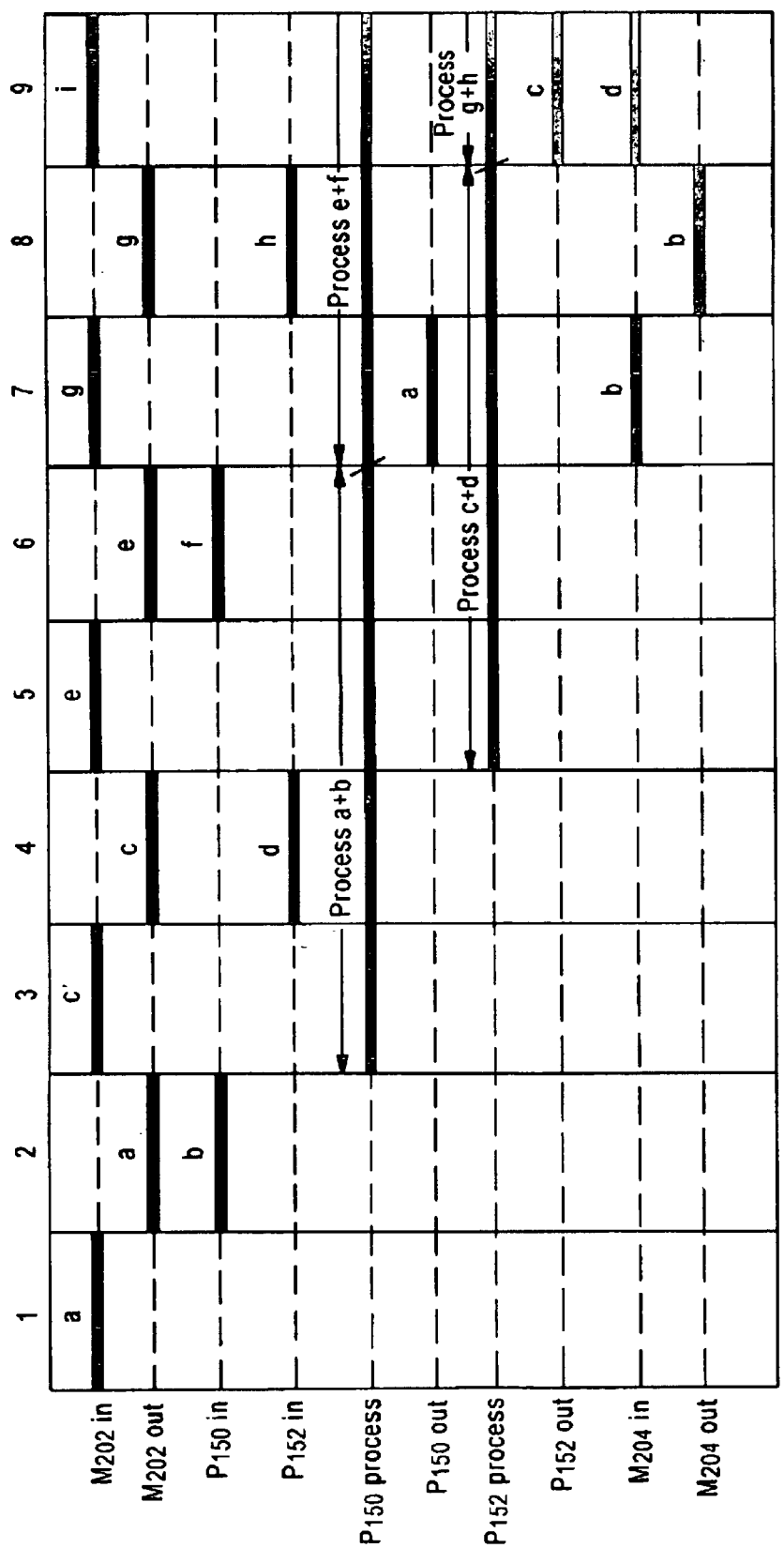
FIG. 6 is a timing diagram of the operation of the pulse compression filter of FIG. 5.

Operation of the pulse compression filter 20 can be described by reference to FIGS. 5 and 6. FIG. 6 is a timing diagram for the pulse compression filter 20, with each time step shown by columns 1–9 and operation of the components of pulse compression filter 20 shown as rows. In time step 1, a digitized rf signal "a" is input into memory 202. In time step 2, the next digitized rf signal "b" is received, and digitized rf signals "a" and "b" are provided to the real and imaginary inputs of processor 150, respectively. In time step 3, a digitized rf signal "c" is input into memory 202, and processor 150 begins processing the complex signal comprising "a" and "b". In time step 4, a digitized rf signal "d" is received, and digitized rf signals "c" and "d" are provided to the real and imaginary inputs of processor 152, respectively. In time step 5, a digitized rf signal "e" is input into memory 202 and processor 152 begins processing the complex signal comprising "c" and "d". In time step 6, processor 150 completes the processing of the complex signal comprising "a" and "b", and accepts the input of signals "e" and "f". In time step 7, the following occurs: processor 150 outputs the pulse compressed rf signal "a" to an output 208 via multiplexers 158 and 206; processor 150 outputs the pulse compressed rf signal "b" to memory 204 via multiplexer 160; processor 150 begins the processing of the complex signal comprising "e" and "f"; and memory 202 accepts a new digitized rf signal "g". In time step 8, the following occurs: processor 152 completes the processing of the complex signal comprising "c" and "d"; processor accepts the input of signals "g" and "h"; and memory 204 provides the pulse compressed signal "b" to output 208 via multiplexer 206. In time step 9, the following occurs: processor 152 outputs the pulse compressed rf signal "c" to output 208 via multiplexers 158 and 206; processor 152 provides the pulse compressed rf signal "d" to memory 204 via multiplexer 160; processor 152 begins the processing of the complex signal comprising "g" and "h"; and memory 202 accepts the input of a new digitized rh signal "i". In time step 10 (not shown), memory 204 provides the pulse compressed signal "d" to output 208 via multiplexer 206, processor 150 completes the processing of the complex signal comprising "e" and "f", and processor 150 accepts new digitized rh signals. It will be recognized that the above process can continue for any number of time steps.

In summary, the pulse compression filter 20 of FIG. 5 processes two digitized rf signals in parallel by temporarily storing each even-numbered digitized rf signal in buffer 202, then loading the odd numbered digitized rf signal into the imaginary input port of one of the processing chips 150, 152, and loading at the same time the stored even-numbered digitized rf signal from buffer 202 into the real port of the same chip 150 or 152. The next even and odd digitized rf signals are similarly loaded into the other processing chip 150 or 152. Thus, pair of digitized rf signals is loaded into each processing chip 150 and 152 once every four signal periods, providing the processing chips 150 and 152 with enough time to perform the filtering operation. When a chip 150 or 152 completes the filtering operation, it outputs the complex filtered signal; the real part of the complex signal is output directly to the signal processor 22 (FIG. 1) via the multiplexers 158 and 206, while the imaginary part of the complex signal is loaded via multiplexer 160 into buffer 531. After the real part has been output, the multiplexer 206 is switched and the stored signal from buffer 204 is output to the signal processor 22. In the next rf signal processing period, the second chip 150 or 152 completes processing, multiplexers 158, 160, and 206 are switched, and the next two filtered signals are output. Thus, the pulse compression filter 20 processes signals in real-time with a pipeline delay of five signal periods.

The operation of the pulse compression filter 20 described hereinabove presumes that the capacity of each processor 150 and 152 is large enough to accept all data values for one rf signal that needs to be pulse compressed. However, it may be advantageous to split the digitized rf signal into several segments and process them separately. In this case, the filter 20 of FIG. 5 may be used to process two segments of the same rf signal in parallel. The operation is similar to that described hereinabove with reference to FIGS. 5 and 6, except that instead of successive digitized rf signals, filter 20 now processes successive segments.

When the rf signal is processed in several segments, the known filtering techniques 'overlap-add' or preferably 'overlap-save' can be applied. According to the overlap-save technique, the input segments are partly overlapping (overlap length equals the impulse response length minus 1). The overlap can be accounted for in both the input and output buffers 100 and 104, where memory units 202 and 204 would act as FIFO devices to delay a portion of each digitized rf signal. Implementation of the overlap-add and overlap-save filtering techniques are well known and are described in further detail in the book *Digital Signal Processing* by Oppenheim & Schafer, Prentice-Hall, Inc, 1975.

In some coherent imaging applications such as medical ultrasound imaging, the signal undergoes a frequency-dependent attenuation as it propagates through the medium. The further the signal propagates the more it is attenuated, and different frequency components are attenuated differently. Due to this phenomenon, the echo from different depths has a different spectrum and therefore requires a different filter frequency characteristic within the pulse compression filter. In other words a depth-variable pulse compression filter is required.

To implement a depth-variable pulse compression filter, the overlap-save filtering technique is used where the segment size is chosen to correspond to a relatively small range over which the signal is not significantly modified by attenuation. For example, in medical ultrasound for a typical 3.75 MHz center frequency, 15 MHz rf sampling frequency, and a filter impulse response of 513 taps, a segment size of 1024 samples is chosen. Considering that two segments are processed in parallel using the method of the present invention, the segment size results in 1024 filtered samples covering a range of $0.5\times(1024\div15\ \text{MHz})\times1.54\ \text{mm}/\mu s = 52.56$ mm. For each 52.56 mm segment, a different filter characteristic may be used. The filter memory 56 of FIG. 2 is provided with sufficient capacity to store several (typically four) filter frequency characteristics and the appropriate filter frequency characteristic is selected for each depth segment.

The appropriate filter frequency characteristic for each depth segment may be calculated adaptively, from the rf signal from each beam or groups of beams, as described by K. Eck and coworkers in "Depth-Dependent Mismatched Filtering Using Ultrasonic Attenuation as a Filter Design Parameter", proceedings of the IEEE Ultrasonics Symposium, 1998. However, a preferred approach is to precalculate a set of filter frequency characteristics by measuring the spectra of echoes from a phantom having attenuation characteristics close to those of tissue.

The phantom used for precalculating filter characteristics is preferably homogeneous (anechoic) except for several strong reflectors (metal or nylon strings) placed at the depths of interest, for example one reflector every 2cm of depth. With an anechoic phantom, the attenuated signal is measured directly because it is generated entirely (except for some additive noise) by the echo from one strong reflector. In order to reduce noise, the echo from each reflector is measured repeatedly and the multiple measurements are averaged, enhancing the signal/noise ratio by a factor equal to the square root of the number of measurements. This is possible with a static phantom in which an arbitrary number of measurements may be performed in identical conditions. Once a reliable estimate of the signal is obtained, the filter frequency characteristic for the pulse compression filter 20 may be computed by one of the many methods known in the art.

While the calculation of the filter's frequency characteristic is best performed off-line, the selection of the appropriate filter during a actual operation may be either fixed, based only on the depth of the filtered signal segment, or may be adaptive, using a simplified real-time attenuation estimation for each segment. Implementation of either the fixed or adaptive methods for selecting the appropriate filter during runtime of a pulse compression filter is well known in the art.

To summarize, the parallel, frequency domain filter 50 described herein allows the parallel processing of two real, digitized rf signals. The parallel processing of two real signals greatly reduces the cost of the filter from that of filters found in the prior art. The implementation of filter 50 in a pulse compression filter 20 for use in a coherent imaging system such as radar or medical ultrasound allows coded waveform imaging to be employed. Additionally, the filter 50 described herein allows the parallel processing of segments of a digitized rf signal. The parallel processing of segments of a digitized rf signal makes it possible to implement the overlap-save and overlap-add filtering methods. Therefore, the apparatus of the invention allows compensation for the effects of attenuation by performing the frequency domain filtering on relatively short signal segments using the overlap-save method. In addition, the apparatus provides storage for multiple filter characteristics, and allows for selection of different characteristics for different depth segments either in a fixed or an adaptive manner. These filter characteristics are preferably obtained off-line in a calibration procedure using a phantom.

While the invention has been described with reference to a preferred embodiment and various alternative embodiments, it will be understood by those skilled in the art that changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of providing frequency-dependent phase delay for real data, the method comprising:

constructing a first complex signal from first and second real signals, the first real signal indicating first real data and the second real signal indicating second real data, said constructing the first complex signal including
   applying the first real signal as a real part of the first complex signal, and
   applying the second real signal as an imaginary part of the first complex signal;

transforming the first complex signal into its frequency spectrum;

multiplying the frequency spectrum of the first complex signal with a first filter frequency characteristic, the first filter frequency characteristic corresponding to a first filter having a real time-domain impulse response, said multiplying the frequency spectrum of the first complex signal creating a frequency spectrum of a filtered first complex signal; and transforming the frequency spectrum of the filtered first complex signal to create a filtered first complex signal including a filtered first real signal as a real part and a filtered second real signal as an imaginary part.

2. The method of claim 1, further including:

selecting the first filter frequency characteristic from a plurality of filter frequency characteristics.

3. The method of claim 2, further including:

constructing a second complex signal from third and fourth real signals, the third real signal indicating third real data and the fourth real signal indicating fourth real data, said constructing the second complex signal including
   applying the third real signal as a real part of the second complex signal, and
   applying the fourth real signal as an imaginary part of the second complex signal;

transforming the second complex signal into its frequency spectrum;

multiplying the frequency spectrum of the second complex signal with a second filter frequency characteristic, the second filter frequency characteristic corresponding to a second filter having a real time-domain impulse response, said multiplying the frequency spectrum of the second complex signal creating a frequency spectrum for a filtered second complex signal; and transforming the frequency spectrum of the filtered second complex signal to create a filtered second complex signal including a filtered third real signal as a real part and a filtered fourth real signal as an imaginary part.

4. The method of claim 3, further including:

selecting the second filter frequency characteristic from the plurality of filter frequency characteristics.

5. The method of claim 1, further including:

adaptively calculating the first filter frequency characteristic from a plurality of signals.

6. The method of claim 1, further including:

calculating the first filter frequency characteristic by measuring the spectra of echoes from a phantom.

7. A parallel, frequency domain filter including:

a fast Fourier transform device arranged to receive a first complex signal and transform the first complex signal into a frequency spectrum of said first complex signal, a real part of said first complex signal including a first real signal indicative of first real data, and an imaginary part of said first complex signal including a second real signal indicative of second real data;

a complex multiplier arranged to multiply the frequency spectrum of said first complex signal by a first filter frequency characteristic to create a frequency spectrum for a filtered first complex signal, said first filter frequency characteristic corresponding to a first filter having a real time-domain impulse response; and an inverse fast Fourier transform device arranged to receive said frequency spectrum for said filtered first complex signal and transform said frequency spectrum for said filtered first complex signal into a filtered first complex signal, said filtered first complex signal including a filtered first real signal as a real part and a filtered second real signal as an imaginary part.

8. The parallel, frequency domain filter of claim 7, further including:

a memory device arranged to select said first filter frequency characteristic from a plurality of filter frequency characteristics, said memory device being further arranged to provide said first filter frequency characteristic to said complex multiplier.

9. The parallel, frequency domain filter of claim 7, wherein said fast Fourier transform device, said complex multiplier, and said inverse fast Fourier transform device are included in a first processing unit.

10. The parallel, frequency domain filter of claim 9, further including:

a second processing unit; and a means for alternately directing complex signals between said first and second processing units.

11. The parallel, frequency domain filter of claim 7, further including:

an input buffer arranged to receive said first and second real signals in series, said input buffer further arranged to direct said first real signal to a real input of said fast Fourier transform device and direct said second real signal to an imaginary input of said fast Fourier transform device.

12. The parallel, frequency domain filter of claim 7, further including:

an output buffer arranged to receive said filtered first complex signal and output said filtered first real signal and said filtered second real signal in series.

13. A coherent imaging system comprising:

a transmission signal generator for generating transmission signals;

a transducer for transmitting waves to an object by said transmission signals and for receiving echoes corresponding to said transmission signals;

a receiver for receiving data signals indicative of said echoes from said transducer and performing beam-forming operations on said data; and a pulse compression filter including:

a first buffer for receiving beam-formed data from said receiver and pairing said beam-formed data into complex signals, each of said complex signals having a real part and an imaginary part, a fast Fourier transform device arranged to receive said complex signals and transform the complex signals into frequency spectra of said complex signals, a complex multiplier arranged to multiply the frequency spectra of said complex signals by a filter frequency characteristic to create frequency spectra for pulse compressed complex signals, and an inverse fast Fourier transform device arranged to transform said frequency spectra for said pulse compressed complex signals into pulse compressed complex signals, each of said pulse compressed complex signals including a pair of pulse compressed real signals.

14. The coherent imaging system of claim 13, wherein said pulse compression filter further includes:

a memory device for storing a plurality of filter frequency characteristics, said plurality of filter frequency characteristics including said filter frequency characteristic.

15. The coherent imaging system of claim 13, wherein said real and imaginary parts of each of said complex signals include beam segments.

16. The coherent imaging system of claim 15, wherein said pulse compression filter incorporates a filtering technique from the group comprising an overlap-add filtering technique and an overlap-save filtering technique.

17. The coherent imaging system of claim 13, wherein said transmission signals are coded wavefornms.

18. The coherent imaging system of claim 17, wherein said transmission signals are selected from the group including linear chirp and Barker code.

19. The coherent imaging system of claim 13, wherein said transmission signals include a coded waveforn followed by a simple signal.

20. The coherent imaging system of claim 19, wherein said pulse compression filter processes a digitized signal indicative of echoes of said coded waveform during a transmit/receive cycle of said simple signal.

21. The coherent imaging system of claim 17, wherein said filter frequency characteristic is selected based beam focus depth.

22. The coherent imaging system of claim 17, wherein said filter frequency characteristic is adaptively calculated.

23. The coherent imaging system of claim 17, wherein said filter frequency characteristic is calculated by measuring the spectra of echoes from a phantom.

* * * * *